United States Patent
Xiong et al.

(10) Patent No.: US 11,061,407 B2
(45) Date of Patent: Jul. 13, 2021

(54) BIPED ROBOT EQUIVALENT TRAJECTORY GENERATING METHOD AND BIPED ROBOT USING THE SAME

(71) Applicant: UBTECH Robotics Corp, Shenzhen (CN)

(72) Inventors: Youjun Xiong, Shenzhen (CN); Zheng Xie, Shenzhen (CN); Chunyu Chen, Shenzhen (CN); Yizhang Liu, Shenzhen (CN); Ligang Ge, Shenzhen (CN)

(73) Assignee: UBTECH Robotics Corp, Shenzhen (CN)

( * ) Notice: Subject to any disclaimer, the term of this patent is extended or adjusted under 35 U.S.C. 154(b) by 346 days.

(21) Appl. No.: 16/231,512

(22) Filed: Dec. 23, 2018

(65) Prior Publication Data

US 2019/0196477 A1 Jun. 27, 2019

(30) Foreign Application Priority Data

Dec. 25, 2017 (CN) .......................... 201711423256.3

(51) Int. Cl.
*G05D 1/02* (2020.01)
(52) U.S. Cl.
CPC ........... *G05D 1/027* (2013.01); *G05D 1/0272* (2013.01); *G05D 2201/0217* (2013.01)
(58) Field of Classification Search
CPC .................................................... G05D 1/027
See application file for complete search history.

(56) References Cited

U.S. PATENT DOCUMENTS

| 8,126,594 | B2* | 2/2012 | Hong | B62D 57/032 |
| | | | | 700/253 |
| 8,738,178 | B2* | 5/2014 | Choi | B62D 57/032 |
| | | | | 700/250 |
| 9,499,218 | B1* | 11/2016 | Stephens | G05D 1/0891 |
| 9,586,316 | B1* | 3/2017 | Swilling | B62D 57/032 |
| 10,081,098 | B1* | 9/2018 | Nelson | B25J 9/1682 |
| 2018/0004208 | A1* | 1/2018 | Su | B62D 57/032 |

OTHER PUBLICATIONS

Erbatur et al. "A study on the zero moment point measurement for biped walking robots", published by IEEE, published in 7th International Workshop on Advanced Motion Control. Proceedings (Cat. No.02TH8623), date of conference Jul. 3-5, 2002, date added to IEEE Xplore Nov. 7, 2002. (Year: 2002).*

* cited by examiner

*Primary Examiner* — Jeff A Burke
*Assistant Examiner* — Madison B Emmett

(57) ABSTRACT

The present disclosure provides an equivalent trajectory generating method for a biped robot and a biped robot using the same. The method includes: obtaining a motion state of the biped robot by a position sensor; determining switching moments in an advancing direction of the biped robot, based on the motion state of the biped robot; finding the mass center position of the biped robot at each switching moment; connecting the mass center positions at the switching moments as an equivalent trajectory of the biped robot; and performing a closed loop control on the biped robot according to the equivalent trajectory. Through the method, the overall real-time position of the robot can be obtained according to the equivalent trajectory effectively, which is advantageous to perform a stable and reliable control to the biped robot according to the equivalent trajectory of the biped robot.

16 Claims, 6 Drawing Sheets

BIPED ROBOT EQUIVALENT TRAJECTORY GENERATING METHOD AND BIPED ROBOT USING THE SAME

CROSS REFERENCE TO RELATED APPLICATIONS

This application claims priority to Chinese Patent Application No. 201711423256.3, filed Dec. 25, 2017, which is hereby incorporated by reference herein as if set forth in its entirety.

BACKGROUND

1. Technical Field

The present disclosure relates to robot control technology, and particularly to an equivalent trajectory generating method for a biped robot and a biped robot using the same.

2. Description of Related Art

It is a key technology for the positioning and navigating of biped robots to combine information of a biped robot such as body mass center positioning information and IMU (inertial measurement unit) information.

However, in the process of the movement of a biped robot, in order to realize dynamic balance, the mass center of the biped robot is oscillating all the time, which does not have a stable movement trajectory. The speed vector of the mass center does not really reflect the overall walking direction of the biped robot. Therefore, when navigating or positioning the biped robot, the trajectory of the mass center of the biped robot can not effectively reflect the overall real-time position of the robot, which is disadvantageous to perform a stable and reliable control to the biped robot according to the trajectory of the mass center of the biped robot.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

Figure 1:
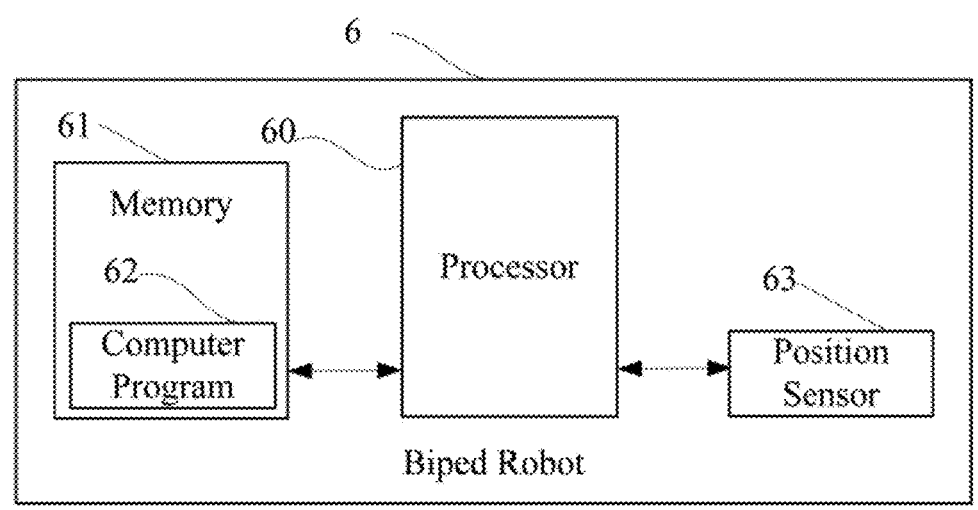
FIG. 1 is a schematic block diagram of a biped robot according to a first embodiment of the present disclosure.
Figure 2:
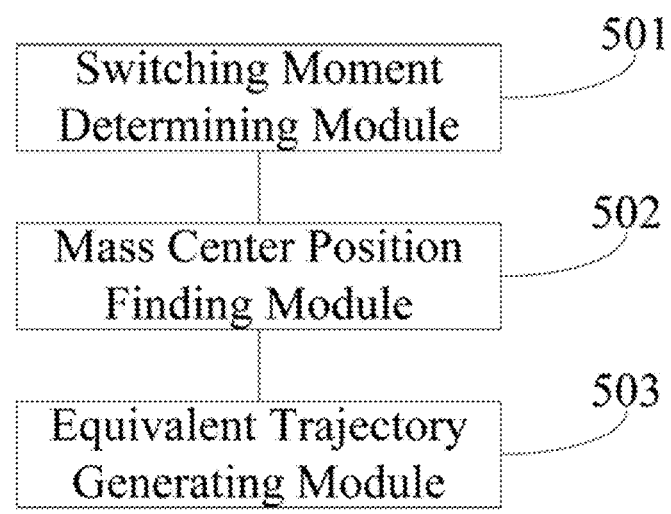
FIG. 2 is a schematic block diagram of a biped robot equivalent trajectory generating apparatus according to a second embodiment of the present disclosure.

FIG. 1 is a schematic block diagram of a biped robot according to a first embodiment of the present disclosure. As shown in FIG. 1, the biped robot 6 of this embodiment includes a processor 60, a memory 61, a computer program 62, and a position sensor 63. The computer program 62 is stored in the memory 61 and executable on the processor 60, for example, a biped robot equivalent trajectory generating program. When executing (instructions in) the computer program 62, the processor 60 implements the steps in the embodiments of the biped robot equivalent trajectory generating method, for example, steps 101-105 shown in FIG. 3. Alternatively, when the processor 60 executes the (instructions in) computer program 62, the functions of each module/unit in the device embodiments, for example, the functions of the modules 501-503 shown in FIG. 2 are implemented.

Exemplarily, the computer program 62 may be divided into one or more modules/units, and the one or more modules/units are stored in the memory 61 and executed by the processor 60 to realize the present disclosure. The one or more modules/units may be a series of computer program instruction sections capable of performing a specific function, and the instruction sections are for describing the execution process of the computer program 62 in the biped robot 6. For example, computer program 62 can be divided into a switching moment determining module, a mass center position finding module, and an equivalent trajectory generating module.

The switching moment determining module is configured to determine a current switching moment when a current mass center position of the biped robot is in an advancing direction of the biped robot based on a motion state of the biped robot.

The mass center position finding module is configured to find the current mass center position of the biped robot at the current switching moment.

The equivalent trajectory generating module is configured to take a connection line between the current mass center position at the current switching moment and a previous mass center position at a previous switching moment as an equivalent trajectory of the biped robot.

It can be understood by those skilled in the art that FIG. 1 is merely an example of the biped robot 6 and does not constitute a limitation on the biped robot 6, and may include more or fewer components than those shown in the figure, or a combination of some components or different components. For example, the biped robot 6 may further include an input/output device, a network access device, a bus, and the like.

The processor 60 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The memory 61 may be an internal storage unit of the biped robot 6, for example, a hard disk or a memory of the biped robot 6. The memory 61 may also be an external storage device of the biped robot 6, for example, a plug-in hard disk, a smart media card (SMC), a secure digital (SD) card, flash card, and the like, which is equipped on the biped robot 6. Furthermore, the memory 61 may further include both an internal storage unit and an external storage device, of the biped robot 6. The memory 61 is configured to store the computer program and other programs and data required by the biped robot 6. The memory 61 may also be used to temporarily store data that has been or will be output.

FIG. 2 is a schematic block diagram of a biped robot equivalent trajectory generating apparatus according to a second embodiment of the present disclosure. The biped robot equivalent trajectory generating apparatus is applied to a biped robot, in which the biped robot has a left foot and a right foot. As shown in FIG. 2, a biped robot equivalent trajectory generating apparatus includes:

a switching moment determining module 501 configured to obtain a motion state of the biped robot by a position sensor (of the biped robot); and determine switching moments when a mass center position of the biped robot is switching from one leg of the biped robot to the other leg of the biped robot in an advancing direction of the biped robot, based on the motion state of the biped robot;

a mass center position finding module 502 configured to find the mass center position of the biped robot at each switching moment; and an equivalent trajectory generating module 503 configured to connect the mass center positions at the switching moments as an equivalent trajectory of the biped robot; and perform a closed loop control on the biped robot according to the equivalent trajectory.

In this embodiment, the equivalent trajectory generating device of the biped robot further comprises:

a mapping module configured to map the mass center position of the biped robot to the equivalent trajectory; and an equivalent speed determining module configured to take a moving speed of the mass center position of the biped robot mapping on the equivalent trajectory as an equivalent speed of the biped robot.

Each of the above-mentioned units/modules may be implemented in the form of hardware (e.g., a circuit), software (e.g., a program), or a combination thereof (e.g., a circuit with a single chip microcomputer). In this embodiment, the biped robot equivalent trajectory generating apparatus further includes a memory, a processor, and a computer program stored in the memory and executable on the processor. In which, the computer program includes the switching moment determining module 501, the mass center position finding module 502, and the equivalent trajectory generating module 503, the switching moment determining module 501 may include:

a hanging foot determining submodule configured to determine a currently hanging foot of the biped robot when the biped machine is walking; and a switching moment determining submodule configured to determine the switching moments based on a currently hanging duration of the hanging foot and a total hanging duration of the biped robot to walk one step.

Figure 3:
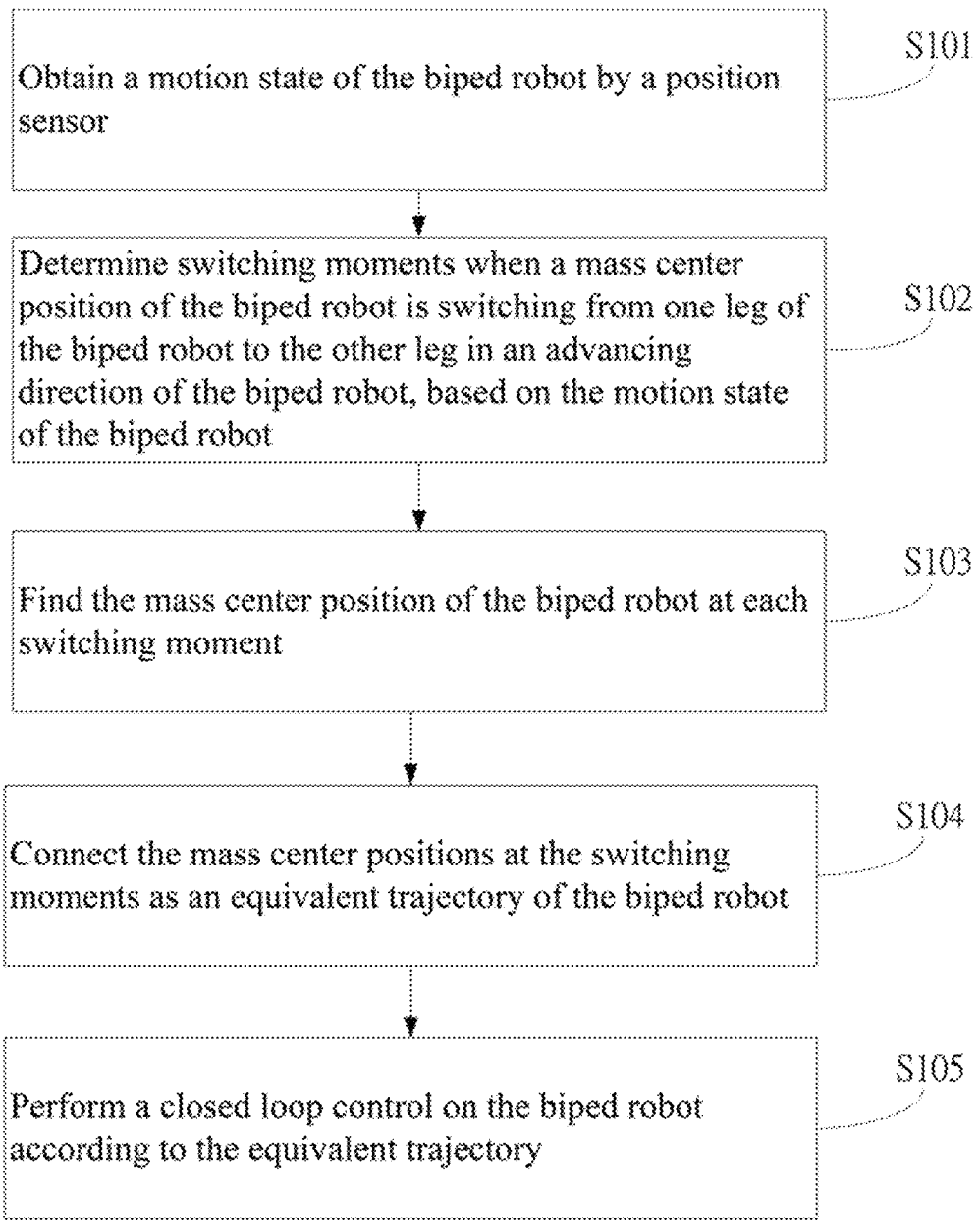
FIG. 3 is a flow chart of a biped robot equivalent trajectory generating method according to a third embodiment of the present disclosure.

The biped robot equivalent trajectory generating apparatus of this embodiment corresponds to the biped robot equivalent trajectory generating method shown in FIG. 3.

FIG. 3 is a flow chart of a biped robot equivalent trajectory generating method according to a first embodiment of the present disclosure. The biped robot equivalent trajectory generating method is applied to a biped robot, in which the biped robot has a left foot and a right toot. In this embodiment, the method is a computer-implemented method executable for a processor, which may be implemented through a biped robot equivalent trajectory generating apparatus shown in FIG. 2. As shown in FIG. 3, the method includes the following steps.

S101: obtaining a motion state of the biped robot by a position sensor.

S102: determining switching moments when a mass center position of the biped robot is switching from one leg of the biped robot to the other leg in an advancing direction of the biped robot, based on the motion state of the biped robot.

The motion state can be obtained by a position sensor in a servo of the biped robot. The position sensor may include a magnetic encoder. Specifically, the motion state of the biped robot during advancing (i.e., stepping) may be a left foot hanging state or a right foot hanging state. In the left foot hanging state, the left foot of the biped robot moves (e.g., steps forwardly, steps backwardly, or makes a turn), while the right foot of the biped robot supports the biped robot. Similarly, in the right foot hanging state, the right foot of the biped robot moves (e.g., steps forwardly, steps backwardly, or makes a turn), while the left foot of the biped robot supports the biped robot.

Figure 4:
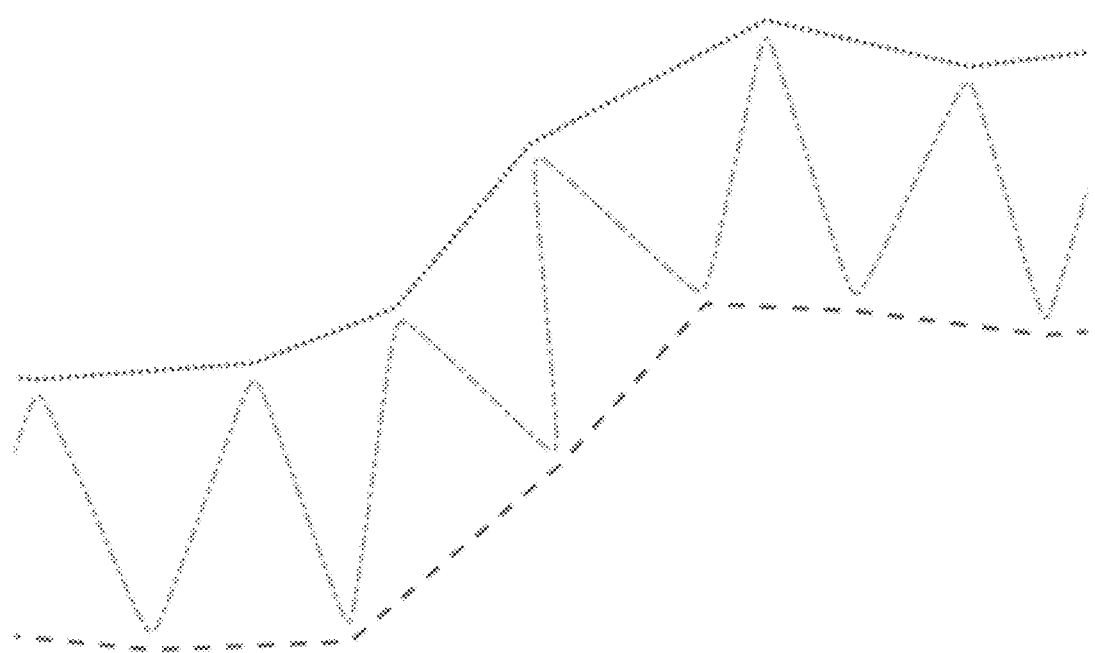
FIG. 4 is a top view of a walking trajectory of the biped robot according to the third embodiment of the present disclosure.

FIG. 4 is a top view of a walking trajectory of the biped robot according to the first embodiment of the present disclosure. As shown in FIG. 4, the dotted line in the upper part is a walking trajectory of the left foot of the biped robot, the dash line in the lower part is a walking trajectory of the right foot of the biped robot, and the dotted and dash line in the middle part is a movement trajectory of a mass center of the biped robot. During the movement of the robot, the movement trajectory of the mass center of the biped robot is a sine-like trajectory, which cannot express the overall real-time position of the biped robot. Therefore, it is disadvantageous to show the overall position and overall speed of the biped robot effectively based on a mass center trajectory of the biped robot, and is disadvantageous to perform a real-time and effective control on the biped robot.

The switching moment when the mass center position of the biped robot is in the advancing direction of the biped robot is that the time point shown in FIG. 4 at which the mass center position of the biped robot coincides with the overall advancing direction of the biped robot, which may be determined based on the hanging time of the left foot or the right foot when the biped robot advances. In one embodiment, step S101 may include:

step 1.1, determining a currently hanging foot of the biped robot when the biped machine is walking; and step 1.2, determining the switching moments based on a currently hanging duration of the hanging foot and a total hanging duration of the biped robot to walk one step.

Based on a real-time control instruction of the biped robot, it can determine whether the currently hanging foot is the left foot or the right foot. Moreover, based on a current advancing speed of the biped robot, a total hanging duration required for the biped robot to walk one step, that is, the left foot or the right foot of the biped robot to take one step, can be determined. The switching moment is determined based on the current hanging duration of the hanging foot of the biped robot and the total hanging duration to walk one step. For example, if it is obtained by statistics that the total hanging duration of the biped robot to walk one step is 0.5 seconds under the current control speed, it can determine that the time point at which the hanging duration of any of the left foot or the right foot of the biped robot which corresponds to half of the total hanging duration is the switching moment. In one embodiment, the total hanging durations for the left foot and the right foot may be set differently, in this case, the corresponding switching moments should be determined respectively according to whether the hanging foot is the left foot or the right foot and according to different total hanging durations.

It should be noted that, the present disclosure is not limited thereto, and the switching moment may also be determined according to statistical information such as the acceleration of the biped robot and the position of the robot to move up and down.

S103: finding the mass center position of the biped robot at each switching moment.

Based on the foot state of the biped robot, the switching moment of the biped robot can be determined. The mass center position of the biped robot corresponding to the switching moment can be found based on the switching moment combined with the mass center trajectory of the biped robot, which can specifically include:

step 2.1, determining a mass center trajectory of the biped robot based on an inverted pendulum model of the biped robot.

In which, the mass center trajectory of the biped robot can be obtained by synthesizing an inverted pendulum motion trajectory in the X direction and another inverted pendulum motion trajectory in the Y direction. As the sinusoid-like mass center trajectory of the robot which is shown in the middle part of FIG. 4, the real-time mass center position of the biped robot at any moment can be determined based on the mass center trajectory of the biped robot.

step 2.2, finding a position of the biped robot on the mass center trajectory at the switching moments to take as the mass center position of the biped robot.

Based on the mass center trajectory of the biped robot determined in 2.1, if it is at the switching moment, the corresponding mass center position can be found in real time. Whenever the biped robot walks one step, the mass center position corresponding to one switching moment can be determined, and the mass center positions corresponding to N switching moments can be determined when the biped robot walks N steps.

S104: connecting the mass center positions at the switching moments as an equivalent trajectory of the biped robot.

Figure 5:
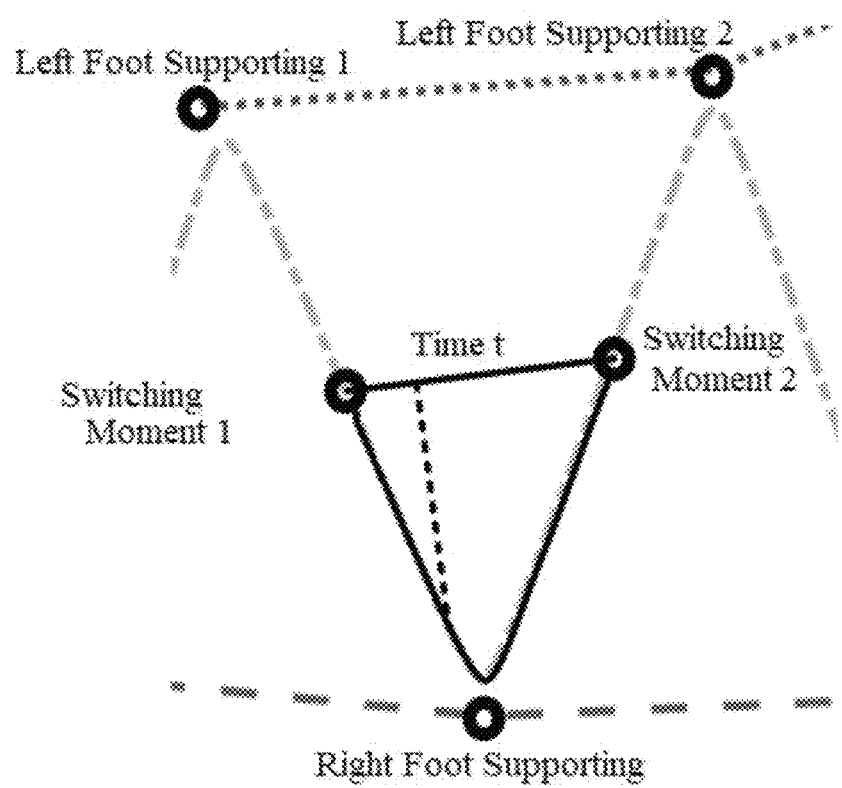
FIG. 5 is a schematic block diagram of one walking cycle of the biped robot according to the third embodiment of the present disclosure.

When the mass center position at the switching moment of the robot in the motion state is obtained, a connection line between the mass center position of the newly obtained switching moment and the mass center position of the previous switching moment is determined, in which the connection line is the equivalent trajectory of the biped robot. FIG. 5 is a schematic block diagram of one walking cycle of the biped robot according to the third embodiment of the present disclosure. As shown in FIG. 5, step S103 may include:

step 3.1, obtaining a first mass center position of the switching moments and a second mass center position of the previous switching moment.

During the advancing of the robot, whether it is at the switching moment is detected in real time, and if yes, the first mass center position of the biped robot corresponding to the switching moment is obtained, and the second mass center position of the biped robot corresponding to the previous switching moment is to be found.

step 3.2, taking a straight line connecting the first mass center position and the second mass center position as the equivalent trajectory of the biped robot corresponding to a moment between the switching moments and the previous switching moment.

As shown in FIG. 5, at the switching moment 1, the corresponding first mass center position is found, and at the switching moment 2, the second mass center position is found, and the first mass center position and the second mass center position are connected to generate the equivalent trajectory of the biped robot.

Figure 6:
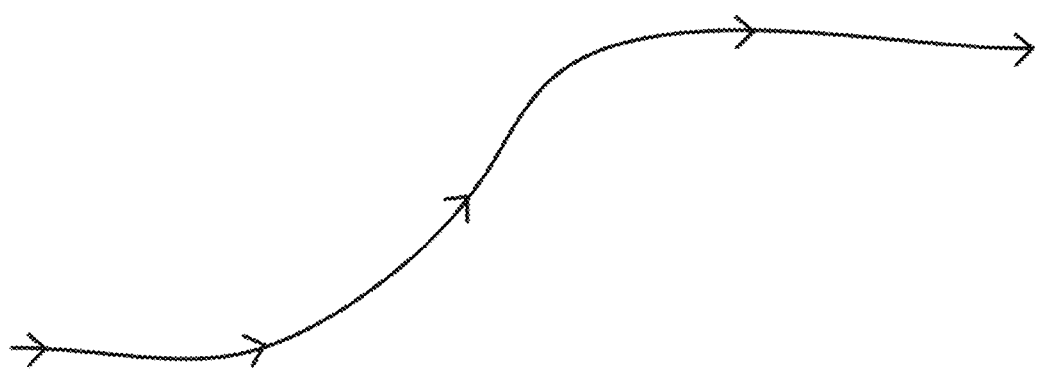
FIG. 6 is a schematic block diagram of an expected trajectory of the biped robot according to the third embodiment of the present disclosure.

Since the generated equivalent trajectory of the biped robot is consistent with the overall movement direction of the biped robot, the advancing direction of the biped robot can be better controlled through the equivalent trajectory of the biped robot, so that the advancing direction of the robot matches the expected trajectory. FIG. 6 is a schematic block diagram of an expected trajectory of the biped robot according to the third embodiment of the present disclosure. For example, when the user wants to obtain the expected trajectory of the biped robot as shown in FIG. 6, the control of the robot can be implemented effectively by only making the generated equivalent trajectory to conform to the expected trajectory, hence the control operation can be more direct and convenient.

In one embodiment, the biped robot equivalent trajectory generating method further includes:

step 4.1, mapping the mass center position of the biped robot to the equivalent trajectory.

As shown in FIG. 5, according to a vector component of the real-time mass center position of the biped robot in the direction of the equivalent trajectory, the real-time mass center position of the biped robot can be mapped to the equivalent trajectory.

step 4.2, taking a moving speed of the mass center position of the biped robot mapping on the equivalent trajectory as an equivalent speed of the biped robot.

S105: performing a closed loop control on the biped robot according to the equivalent trajectory.

Based on the moving speed of the current mass center position of the biped robot mapping on the equivalent trajectory, the equivalent speed of the biped robot can be determined. In which, the equivalent speed is the advancing speed of the biped robot in an overall direction. After obtaining the advancing speed of the biped robot in the overall direction, simpler feedback information of the advancing speed can be obtained, and a closed-loop control of the biped robot can be implemented in a better manner when the equivalent speed and/or the equivalent trajectory of the robot is transmitted to a navigation layer.

It should be understood that, the sequence of the serial number of the steps in the above-mentioned embodiments does not mean the execution order while the execution order of each process should be determined by its function and internal logic, which should not be taken as any limitation to the implementation process of the embodiments.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented equivalent trajectory generating method for a biped robot, comprising executing on a processor the steps of:
   obtaining a motion state of the biped robot by a position sensor;
   determining switching moments when a mass center position of the biped robot is switching from one leg of the biped robot to the other leg of the biped robot in an advancing direction of the biped robot, based on the motion state of the biped robot, wherein the advancing direction of the biped robot is a walking trajectory of the biped robot corresponding to an overall advancing direction of the biped robot;
   finding the mass center position of the biped robot at each switching moment;
   connecting the mass center positions at the switching moments as an equivalent trajectory of the biped robot; and
   performing a closed loop control on the biped robot according to the equivalent trajectory;
   wherein the step of finding the mass center position of the biped robot at each switching moment comprises:
   determining a mass center trajectory of the biped robot based on an inverted pendulum model of the biped robot; and
   finding a position of the biped robot on the mass center trajectory at the switching moments to take as the mass center position of the biped robot; and
   wherein the step of determining the switching moments comprises:
   determining a currently hanging foot of the biped robot when the biped robot is walking; and
   determining beginning moment and ending moment of each of walking cycles of the biped robot to take as the switching moments based on a currently hanging duration of the hanging foot and a total hanging duration of the biped robot to walk one step.

2. The method of claim 1, wherein after the step of connecting the mass center positions at the switching moments as the equivalent trajectory of the biped robot further comprises:
vertically mapping the mass center position of the biped robot to the equivalent trajectory; and
taking a moving speed of the mass center position of the biped robot vertically mapping on the equivalent trajectory as an equivalent speed of the biped robot.

3. The method of claim 1, wherein the step of connecting the mass center positions at the switching moments comprises:
obtaining a first mass center position of the switching moments and a second mass center position of the previous switching moment; and
taking a straight line connecting the first mass center position and the second mass center position as the equivalent trajectory of the biped robot corresponding to a moment between the switching moments and the previous switching moment.

4. The method of claim 1, wherein the switching moments are time points at which the mass center position of the biped robot coincides with the overall advancing direction of the biped robot.

5. The method of claim 1, wherein the step of determining the currently hanging foot of the biped robot when the biped robot is walking comprises:
determining whether the currently hanging foot of the biped robot is a left foot or a right foot of the biped robot when the biped robot is walking, based on a real-time control instruction of the biped robot.

6. The method of claim 5, wherein the total hanging durations of the biped robot to walk one step for the left foot and the right foot are set differently.

7. The method of claim 1, wherein the total hanging duration of the biped robot to walk one step is determined based on a current advancing speed of the biped robot.

8. The method of claim 1, wherein the mass center trajectory of the biped robot is obtained by synthesizing an inverted pendulum motion trajectory in X direction and another inverted pendulum motion trajectory in Y direction, and the mass center trajectory of the biped robot is a sinusoid-like mass center trajectory.

9. A biped robot, comprising:
a position sensor;
a memory;
one or more processors; and
one or more computer programs stored in the memory and executable on the one or more processors, wherein the one or more computer programs comprise:
instructions for obtaining a motion state of the biped robot by the position sensor;
instructions for determining switching moments when a mass center position of the biped robot is switching from one leg of the biped robot to the other leg of the biped robot in an advancing direction of the biped robot, based on the motion state of the biped robot, wherein the advancing direction of the biped robot is a walking trajectory of the biped robot corresponding to an overall advancing direction of the biped robot;
instructions for finding the mass center position of the biped robot at each switching moment;
instructions for connecting the mass center positions at the switching moments as an equivalent trajectory of the biped robot; and
instructions for performing a closed loop control on the biped robot according to the equivalent trajectory;
wherein the instructions for finding the mass center position of the biped robot at each switching moment comprise:
instructions for determining a mass center trajectory of the biped robot based on an inverted pendulum model of the biped robot; and
instructions for finding a position of the biped robot on the mass center trajectory at the switching moments to take as the mass center position of the biped robot; and
wherein the instructions for determining the switching moments comprise:
instructions for determining a currently hanging foot of the biped robot when the biped robot is walking; and
instructions for determining beginning moment and ending moment of each of walking cycles of the biped robot to take as the switching moments based on a currently hanging duration of the hanging foot and a total hanging duration of the biped robot to walk one step.

10. The robot of claim 9, wherein the one or more computer programs further comprise:
instructions for vertically mapping the mass center position of the biped robot to the equivalent trajectory; and
taking a moving speed of the mass center position of the biped robot vertically mapping on the equivalent trajectory as an equivalent speed of the biped robot.

11. The robot of claim 9, wherein the instructions for connecting the mass center positions at the switching moments comprise:
instructions for obtaining a first mass center position of the switching moments and a second mass center position of the previous switching moment; and
instructions for taking a straight line connecting the first mass center position and the second mass center position as the equivalent trajectory of the biped robot corresponding to a moment between the switching moments and the previous switching moment.

12. The robot of claim 9, wherein the switching moments are time points at which the mass center position of the biped robot coincides with the overall advancing direction of the biped robot.

13. The robot of claim 9, wherein the instructions for determining the currently hanging foot of the biped robot when the biped robot is walking comprise:
instructions for determining whether the currently hanging foot of the biped robot is a left foot or a right foot of the biped robot when the biped robot is walking, based on a real-time control instruction of the biped robot.

14. The robot of claim 13, wherein the total hanging durations of the biped robot to walk one step for the left foot and the right foot are set differently.

15. The robot of claim 9, wherein the total hanging duration of the biped robot to walk one step is determined based on a current advancing speed of the biped robot.

16. The robot of claim 9, wherein the mass center trajectory of the biped robot is obtained by synthesizing an inverted pendulum motion trajectory in X direction and another inverted pendulum motion trajectory in Y direction, and the mass center trajectory of the biped robot is a sinusoid-like mass center trajectory.

* * * * *